Figure 1:
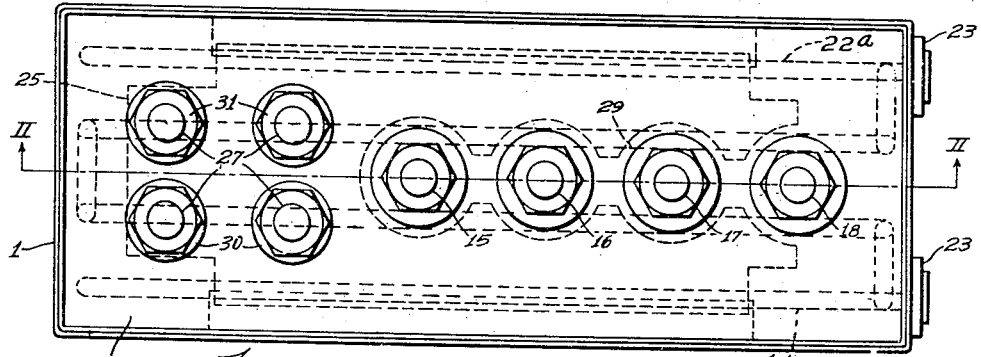

Dec. 17, 1946.    R. E. MARBURY ET AL    2,412,898
WATER-COOLED CAPACITOR
Filed April 29, 1942    2 Sheets-Sheet 1

WITNESSES:
C. J. Weller.
F. C. Lyle

INVENTORS
Ralph E. Marbury and
Charles V. Fields.
BY
O. B. Buchanan
ATTORNEY

Dec. 17, 1946.  R. E. MARBURY ET AL  2,412,898
WATER-COOLED CAPACITOR
Filed April 29, 1942   2 Sheets-Sheet 2
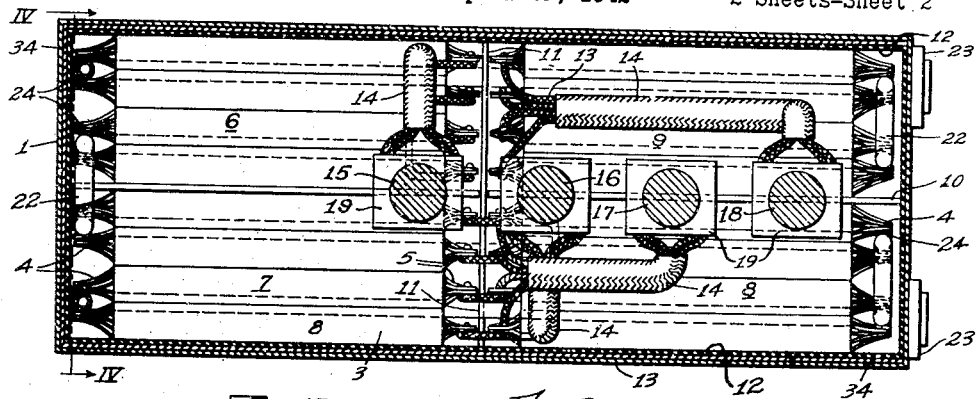
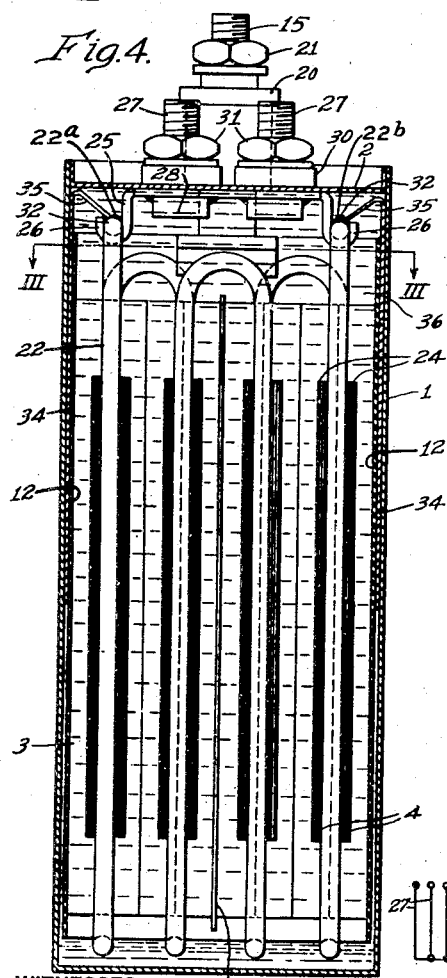
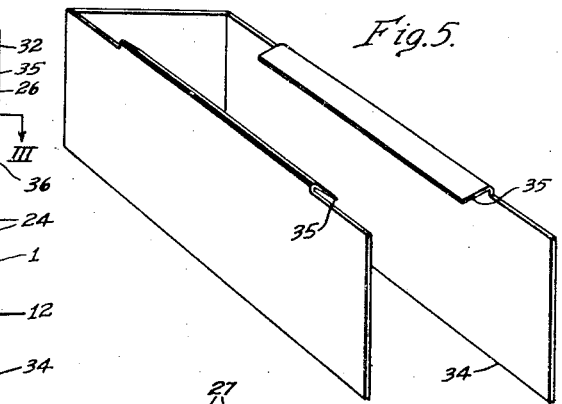
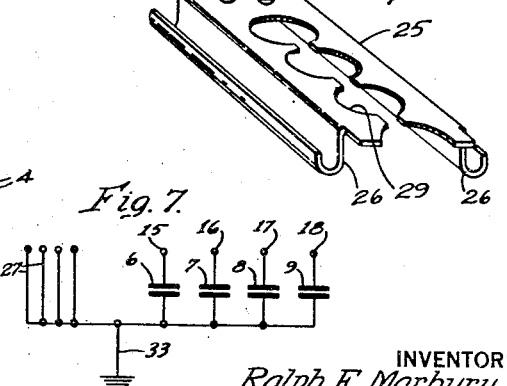
WITNESSES:
C. J. Weller
F. P. Lyle
INVENTORS
Ralph E. Marbury and
Charles V. Fields.
BY
O. B. Buchanan
ATTORNEY Patented Dec. 17, 1946

2,412,898

UNITED STATES PATENT OFFICE 2,412,898

WATER-COOLED CAPACITOR

Ralph E. Marbury, Wilkinsburg, and Charles V. Fields, Chalfant Borough, Pa., assignors to Westinghouse Electric Corporation, East Pittsburgh, Pa., a corporation of Pennsylvania Application April 29, 1942, Serial No. 441,010

3 Claims. (Cl. 175—41)

The present invention relates to electrical capacitors, and more particularly to water-cooled capacitors for high frequency service.

Capacitor units for power-factor correction usually consist of a plurality of individual capacitor elements or sections assembled in a metal case or tank, which is filled with a suitable dielectric liquid. The dielectric losses in such capacitors generate heat which must be dissipated in order to keep the internal working temperature of the capacitor within permissible limits. In the usual designs of capacitors for use on transmission or distribution systems operating at a frequency of 60 cycles, the radiation of heat from the case is sufficient to keep the internal temperature at the desired value, and no special means for cooling such capacitors is necessary or customary.

When capacitors are designed for use on higher frequencies, such as in connection with induction heating installations, which operate at frequencies of the order of 10,000 cycles or higher, the rating of a capacitor unit of given size can be increased approximately in proportion to the frequency, but the losses also increase in at least the same proportion, and the temperature rise caused by the losses in the unit becomes the limiting factor in determining the rating which can safely be given to it. For this reason it is necessary to provide special means for cooling such capacitors in order to effectively dissipate the heat generated in them so as to obtain the highest possible rating for a capacitor unit of given size, and this is usually done by means of a cooling coil through which water may be circulated, which is placed inside the case of the unit. It has been found that the most effective cooling is obtained by connecting the cooling coil directly to the metallic foils of the individual capacitor sections, so that a path of low thermal resistance is provided for the heat through the foils directly to the cooling coil, and except for the heat which flows across the paper which separates the foils, no reliance is placed on conduction of heat through the insulating materials used in the capacitor, which usually have very poor thermal conductivity. With this arrangement, very effective cooling is obtainable and very high ratings can be given to units of relatively small size.

Certain other problems, however, are also encountered in the design of high frequency capacitor units, and especially in those designed for relatively low voltages, such as 200 or 300 volts, where the high ratings result in very large currents. The problem of handling heavy currents can be solved by the use of a plurality of parallel-connected terminals, but the high currents in the parallel-connected terminals and their internal leads produce strong magnetic fields which cause serious heating difficulties. Thus, the high-frequency magnetic flux produced by these currents passes through the metal case and the metal cover and causes magnetic hysteresis and eddy current losses in them. The hysteresis loss can be eliminated by the use of non-magnetic material for the case and cover, but the eddy current losses present a serious problem which cannot readily be solved merely by the choice of material. A non-magnetic material such as stainless steel which is thin enough to have sufficiently high resistance to reduce the magnitude of the eddy currents to a point where the heating is not objectionable, is too thin to be practical because of its mechanical weakness, while a material such as thick sheet copper, which has low enough resistance to effectively short-circuit the induced eddy currents, is not economical and is also somewhat impractical mechanically.

The amount of energy dissipated in these eddy currents is relatively small, and does not seriously increase the total losses in the capacitor, but this energy is concentrated in relatively small areas in the cover member, especially around the terminals, and, to a somewhat lesser extent, in the upper part of the walls of the case. This concentration of eddy currents in relatively small areas has resulted in excessive heating in these areas and, in conventional designs, parts of the cover and case sometimes reach temperatures as high as 300° C., which is hot enough to cause softening of solder. This concentration of the eddy current losses in limited areas is due to the configuration of the magnetic fields produced by the currents flowing through the internal leads and the terminals of the capacitor, and it cannot be avoided, in any capacitor in which the current enters and leaves through terminals mounted on the top of the case, which is a practical requirement. The heating, in the neighborhood of the terminals, is also aggravated by heat which flows into the capacitor from the external circuits or bus bars which are connected to the terminals, and this is also a practical condition which usually cannot be avoided and which must be considered in the design of the capacitor. This localized heating due to concentration of eddy current losses in limited areas, therefore, constitutes a serious problem in the design of high frequency capacitors, especially for low voltage ratings where the currents are high.

The principal object of the present invention is to provide a water-cooled capacitor unit for high frequency service in which objectionable heating due to magnetic and eddy current losses in the case and cover is substantially eliminated.

Another object of the invention is to provide a water-cooled capacitor unit in which provision is made for directly cooling the cover of the case and the terminals.

A further object of the invention is to provide a capacitor unit having shielding means in the case which prevents the magnetic flux produced by the currents flowing in the unit from linking the case, so as to substantially eliminate heating of the case caused by eddy current losses.

A still further object of the invention is to provide a capacitor unit in which water-cooled flux shields are used to prevent magnetic and eddy current losses in the case and cover of the unit, and to cool the case and cover directly.

A more specific object of the invention is to provide a capacitor unit for high frequency service in which a water-cooled flux shield is provided for the cover of the case which cools the cover directly and shields it from the magnetic flux produced by the currents in the unit, and in which a water-cooled flux shield is also provided to shield at least those parts of the case in which objectionable eddy current heating would occur.

Figure 2:
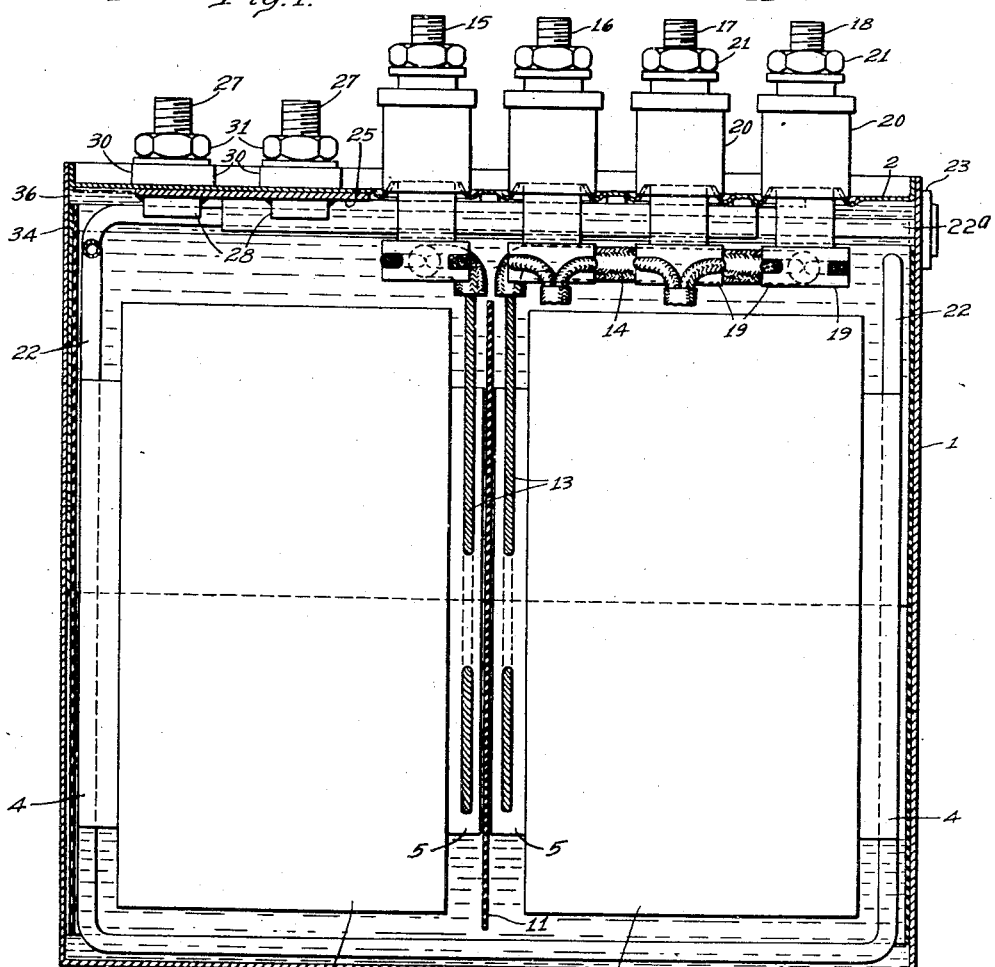

The invention will be more fully understood from the following detailed description, taken in connection with the accompanying drawings in which:

Figure 1 is a plan view of a capacitor unit embodying the invention,

Fig. 2 is a longitudinal sectional view approximately on the line II—II of Fig. 1, Fig. 3 is a sectional plan view on the line III—III of Fig. 4, Fig. 4 is a transverse sectional view on the line IV—IV of Fig. 3, Fig. 5 is a perspective view of a flux shield for the case, Fig. 6 is a perspective view of a flux shield and cooling plate for the cover, and Fig. 7 is a schematic diagram showing the internal electrical connections of the unit.

The invention is shown in the drawings as embodied in a water-cooled capacitor unit which is contained in a metal case or tank 1 having a cover member 2. The case 1 and cover 2 are preferably made of a non-magnetic material, such as stainless steel or copper, although in some instances the present invention may make it possible to use magnetic material, such as ordinary steel, without serious difficulty. The case is generally rectangular and is preferably of welded construction in order to make it leak-proof. The cover member 2 fits into the top of the case 1 to completely close it, and is welded in place after the unit has been completely assembled so as to seal it against the entrance of moisture or leakage of the dielectric liquid 36 with which the case is filled.

The capacitor unit consists essentially of a plurality of capacitor elements or sections 3. The capacitor sections 3 may be made in the usual manner, and each consists of a pair of metallic foils, preferably thin copper foil, separated by layers of thin paper dielectric. The interleaved foils and paper dielectric are wound into a roll on a mandrel, with the foil of one polarity projecting beyond the paper dielectric at one side of the roll, and the foil of opposite polarity projecting beyond the paper at the other side. After winding, the mandrel is removed and the roll is flattened to form a multi-layer, generally rectangular capacitor section, which may then be impregnated in the usual manner. The extending foil edges on opposite sides of the section are trimmed off at the ends, and eyeleted together to form an extending low voltage or ground terminal 4 at one side of the section and a similar high voltage terminal 5 at the other side of the section.

In the illustrated embodiment, there are sixteen capacitor sections 3 which are assembled in the case 1 in four groups, 6, 7, 8 and 9, of four sections each. The four groups of capacitor sections are separated by a longitudinal plate 10 of insulating material, such as pressboard, and by transverse plates 11 of similar material. The capacitor sections 3 are also insulated from the case by layers of suitable insulating material 12, and the entire assembly of capacitor sections may be held together in any suitable manner, as by bands of cotton tape wrapped around the outside of the insulating layers 12.

The capacitor sections 3 in each of the four groups 6, 7, 8 and 9 are disposed, as clearly shown in Fig. 3, with the high voltage terminals 5 at the center of the case and the low voltage or ground terminals 4 at the ends of the case, the high voltage terminals 5 of the different groups being separated by the insulating plates 10 and 11. Suitable leads 13 are connected to each of the high voltage terminals 5, and all of the leads 13 from each one of the four groups 6, 7, 8 and 9, are brought together into a cable 14 for connection to one of the high voltage terminals of the capacitor unit. There are four high voltage terminal studs 15, 16, 17 and 18, one for each of the four groups of capacitor sections 6, 7, 8 and 9. Each of the terminal studs 15 to 18 terminates within the case in a slotted block 19 in which the leads 13 from one of the cables 14 are soldered, and the terminal studs extend through the cover 2, and are insulated from it by suitable insulating bushings 20 which are secured in the cover and sealed to prevent leakage of the liquid 36. Each of the terminal studs is provided with suitable nuts 21 for securing bus bars or other external connections thereto.

In order to effectively remove the heat generated in the capacitor sections 3 by the dielectric losses in them, a cooling coil 22 is placed in the case 1. The cooling coil 22 is preferably formed of a single length of copper tubing and, as shown in the drawings, the coil is arranged with vertically extending loops at each end of the case 1 connected by bottom horizontal tubing portions extending from end to end of the case at the bottom. In practicing the invention, it is necessary, as will subsequently appear, to use a form of cooling-coil 22 in which the inlet and outlet coil-ends 22a and 22b extend horizontally under the top or cover 2 of the case, from one end of the case to the other, between the capacitor-sections 3 and the cover 2. These coil-ends 22a and 22b then extend through the wall of the case 1, and terminate in suitable bushings 23, which are soldered to the case 1, and which provide means for connecting the cooling coil 22 to an external water system. This arrangement of the cooling coil is very advantageous since it is non-inductive, and thus there is no reactive drop in the coil, which is used as a conductor to connect the sections 3 to the ground terminals. As shown in Figs. 3 and 4, the vertical portions of the coil 22 run parallel to and between the ground terminals 4 of the capacitor sections 3, and after the coil and sections are assembled in the position shown, the ground terminals 4 are soldered directly to the vertical portions of the coil 22, as indicated at 24, to provide a permanent connection of good thermal and electrical conductivity between the capacitor foils and the cooling coil 22. In this way, a path of low thermal resistance is provided for the heat which is generated by the dielectric losses in the capacitor sections 3, and the heat flows out through the metallic foils and the cooling coil and is thus effectively removed. The cooling coil also serves as a water-cooled conductor through which the ground terminals of the capacitor sections are connected to the low voltage terminals mounted on the cover, as hereinafter described.

The distribution or configuration of the magnetic fields, produced by the currents flowing through the leads and terminals of the capacitor, causes serious eddy current heating in the cover 2 of a capacitor unit constructed as described above, in addition to any heat which flows into the cover 2 from the external bus-bars or circuit-connections to which the capacitor terminals are connected when the capacitor is in service. In accordance with the invention, a combined flux shield and cooling plate 25 is therefore provided, in order to reduce the eddy current losses in the cover 2, and the shield and cooling plate 25 is itself cooled in order to carry away such heat as may be generated by the reduced eddy-current losses in the cover or in the plate, and also to carry away any heat flowing into the cover from the external bus-bars. The combined cooling plate and flux shield 25 is shown in Fig. 6, and consists of a plate of copper, or other suitable material of good heat and electrical conductivity. The shield 25 is intended to be placed in contact with the cover member 2 and to cover a substantial part of its area, and it is made of generally rectangular outline, with lateral flange portions 26 which are bent downward and formed, at their lower ends, into a trough shape. There are four low voltage or ground terminal studs 27 on the cover of the capacitor unit, and these studs are preferably mounted on the shield plate 25. The terminal studs 27 extend through holes in the plate 25, and their heads 28 are soldered to its bottom surface. The shield plate 25 also has four generally circular openings 29 cut in it to provide sufficient clearance around the high voltage terminal studs 15, 16, 17 and 18.

The shield plate 25 is placed in direct contact with the under surface of the cover member 2, and is secured to it by means of nuts 30 which are threaded on the terminal studs 27 and soldered to the top surface of the cover member 2. Nuts 31 may also be provided on the terminal studs 27 for attachment of bus bars or other external connections. The holes 29 in the shield-plate 25 encircle the high-voltage terminals 15 to 18 with adequate clearance to prevent danger of short-circuiting the unit. It will be seen, further, that the shield plate 25 is held in close contact with the cover member 2 over a large part of its surface, including the areas around the terminals in which the eddy current heating conditions are the worst. The depending lateral flanges 26 of the shield plate 25 extend under the horizontal inlet and outlet portions 22a and 22b of the cooling coil 22, and these portions of the cooling coil are placed in the troughs of the shield-flanges 26 and are soldered thereto, as indicated at 32, to provide a permanent connection of good thermal and electrical conductivity. Thus, the cover member and terminals are directly cooled by the cooling coil 22, since a path of low thermal resistance is provided through the plate 25 directly from the cover and terminals to the cooling coil.

It will also be seen that the ground terminals 27 are connected electrically to the ground terminals 4 of the capacitor sections 3 through the plate 25 and the cooling coil 22. The internal electrical connections of the capacitor unit are shown in Fig. 7. Each one of the four groups of capacitor sections 6, 7, 8 and 9 is connected on one side to one of the terminals 15, 16, 17 and 18. The other sides of the four groups of capacitor sections are connected together through the cooling coil 22 and are grounded to the case, as indicated at 33, through the cooling coil and the plate 25, which also connects them to the four ground terminals 27. The use of a plurality of parallel-connected terminals makes it possible for this capacitor unit to handle very large currents, but it will be understood that a smaller number of terminals might be used in some instances if the currents to be carried by the unit permit.

Considerable trouble is also caused in these high frequency units by eddy current heating in the upper portions of the case itself. In accordance with the present invention, a flux shield 34 is provided to substantially eliminate this difficulty. The shield 34, as shown in Fig. 5, is a box-like member, preferably of copper, and having one end open. The shield also has inwardly and downwardly extending lips 35 on opposite sides to provide for connection to the cooling coil. The shield 35 is placed in the case 1 between the insulation 12 and the upper part of the wall of the case, and preferably is pressed into place in direct contact with the walls of the case 1. The shield 34 extends only part way down the walls of the case, since the objectionable eddy current heating is confined to the upper parts of the case, and the lips 35 of the shield 34 extend downwardly into the troughs of the lateral portions 26 of the plate 25, and are soldered to the cooling coil in these troughs at 32. The shield 34 extends around at least three sides of the capacitor case 1 to shield it from the magnetic flux, and thus it effectively prevents eddy currents in that portion of the case. The shield is directly cooled by the cooling coil 22 so that the heat generated in the shield is removed by the cooling water, and because of this connection to the cooling coil, the shield provides for directly cooling the case itself.

The capacitor unit of the present invention substantially eliminates the difficulties caused by magnetic and eddy current losses in the metal case. Thus, the shields 25 and 34 prevent any of the magnetic flux produced by the current flowing in the unit from linking the walls of the case and the cover member, and the eddy current losses due to this cause are substantially completely eliminated. The flux shields themselves are directly cooled by the water flowing through the cooling coil 22, so that no undesirable heating of the shields can occur. The currents flowing through the terminals 16 to 18 and 27 produce some magnetic flux which links the cover member 2, but the heat produced by the eddy currents caused by this flux is rapidly and effectively carried away because of the direct thermal path through the cooling plate and shield 25 to the cooling coil 22, so that no objectionable heating occurs. Thus, the shield members effectively prevent any objectionable heating of the case or cover of the capacitor, and substantially eliminate the undesirable magnetic and eddy current losses which have heretofore constituted a serious problem.

It should now be apparent that a water-cooled capacitor has been provided which has many advantages. The substantially complete elimination of the magnetic and eddy current losses in the case and cover results in the prevention of excessive heating in localized areas which has been a very serious problem in capacitors of this type. As one example of the effectiveness of this invention, reference may be made to a capacitor unit rated 300 kva. at 9600 cycles and 200 volts. With the previously used constructions in which no flux shields were used, this unit could be rated only for 10% duty cycle, which means that the unit was energized for one minute and then deenergized for nine minutes. The current carried by this unit was 1500 amperes, and with this current the temperature of the case and cover became intolerably high due to eddy current and magnetic losses, if it were attempted to operate the unit for longer periods without intervening periods for cooling off. A capacitor of similar construction but utilizing the flux shields of the present invention, however, can be operated continuously at its formerly intermittent rating of 1500 amperes, without objectionable heating of the case or cover.

It is to be understood, of course, that various modifications and changes may be made without departing from the spirit of the invention. Thus, in some cases it may be possible to use magnetic material, such as ordinary steel, for the case or even for the cover of the unit, and a smaller or larger number of terminals may be used. The internal arrangement of the cooling coil and sections may be changed, although the arrangement described has been found to be the most satisfactory. In some cases, it may be possible to entirely omit the shield 34 between the capacitor sections and the walls of the case, if the eddy current heating in the case itself does not become objectionably high, but, in general, it is preferable to provide flux shielding means for both the case and the cover of the unit.

It is to be understood, therefore, that although a specific embodiment of the invention has been shown and described for the purpose of illustration, the invention is not limited to the exact construction shown, but in its broader aspects it also includes all embodiments and modifications which come within the scope of the appended claims.

We claim as our invention:

1. A high-current, high-frequency capacitor comprising a metal case having a metal top-cover, a plurality of flat capacitor-sections having section-terminals of opposite polarity extending from opposite ends of the sections, said capacitor-sections being disposed in said case with said section-terminals spaced from the walls of the case, cooling-coil means disposed inside of the case and having inlet and outlet terminals for circulating a cooling fluid therein, said cooling-coil means having a portion in good heat-interchanging relation with the low-voltage section-terminals, said cooling-coil means having a top-portion disposed under the top-cover between the capacitor-sections and said top-cover, said top-cover having a plurality of parallel-connected low-voltage capacitor-terminals and a plurality of insulated high-voltage capacitor-terminals for external capacitor-connections, internal leads connecting at least some of said capacitor-terminals to section-terminals, and a top-shield of good electrical and thermal conductivity having a wide-area portion in thermal contact with the under surface of said top-cover, and having a flange-portion in good heat-interchanging relation with the top-portion of the cooling-coil, said top-shield having openings for said high-voltage capacitor-terminals.

2. A capacitor as defined in claim 1, in which the cooling-coil means is in electrically conducting relation to the low-voltage section-terminals, and in which the top-shield carries a plurality of low-voltage capacitor-terminals and is in electrically conducting relation to the top-portion of the cooling-coil.

3. A capacitor as defined in claim 1, in combination with a side-shield of good thermal conductivity extending over at least the upper parts of the side-walls of said metal case on at least three sides of the case, said side-shield being in thermal contact with said side-walls and having a portion in good heat-interchanging relation with the cooling coil.

RALPH E. MARBURY.
CHARLES V. FIELDS.